(12) United States Patent
Chen et al.

(10) Patent No.: US 7,543,883 B2
(45) Date of Patent: Jun. 9, 2009

(54) ROOF RAIL WITH INTEGRALLY FORMED PINCHED FLANGES

(75) Inventors: Xiaoming Chen, Canton, MI (US); Omar Faruque, Ann Arbor, MI (US); Thierry Guimberteau, Livonia, MI (US); Louis Ratsos, Commerce Township, MI (US); Dean Gericke, Brighton, MI (US); Daniel Szalay, Belleville, MI (US)

(73) Assignees: Ford Global Technologies, LLC, Dearborn, MI (US); Vari-Form, Inc., Warren, MI (US)

( * ) Notice: Subject to any disclaimer, the term of this patent is extended or adjusted under 35 U.S.C. 154(b) by 287 days.

(21) Appl. No.: 11/548,334

(22) Filed: Oct. 11, 2006

(65) Prior Publication Data

US 2008/0088157 A1 Apr. 17, 2008

(51) Int. Cl.
*B60N 99/00* (2006.01)
(52) U.S. Cl. .............................. 296/203.03; 296/193.04
(58) Field of Classification Search ............ 296/193.04, 296/203.03
See application file for complete search history.

(56) References Cited

U.S. PATENT DOCUMENTS

| | | | |
|---|---|---|---|
| 5,070,717 A | 12/1991 | Boyd et al. | |
| 5,096,254 A * | 3/1992 | Sparke | 296/193.06 |
| 5,431,326 A | 7/1995 | Ni et al. | |
| 6,116,680 A | 9/2000 | Hunter et al. | |
| 6,247,344 B1 | 6/2001 | Eipper | |
| 6,302,478 B1 | 10/2001 | Jaekel et al. | |
| 6,467,146 B1 | 10/2002 | Herman | |
| 6,523,887 B1 | 2/2003 | Picken et al. | |
| 6,739,166 B1 | 5/2004 | Shah | |
| 6,948,768 B2 | 9/2005 | Corcoran et al. | |
| 2006/0061137 A1 | 3/2006 | Stojkovic et al. | |

OTHER PUBLICATIONS

International Search Report for PCT/US07/80794 dated Sep. 25, 2008.

* cited by examiner

*Primary Examiner*—Lori L Lyjak
(74) *Attorney, Agent, or Firm*—Frederick Owens Brooks Kushman P.C.

(57) ABSTRACT

A support rail for a vehicle has an A-pillar portion and a roof rail portion. The roof rail and A-pillar are formed with a tubular body portion and longitudinally extending support flanges. The support flanges are formed by pinching the blank during the hydroforming process to provide a double thickness flange. A windshield support flange, roof support flange and door opening flange are formed to extend outwardly from the tubular body portion. Front and rear tube connectors include blind openings or notches to facilitate welding.

12 Claims, 3 Drawing Sheets

ROOF RAIL WITH INTEGRALLY FORMED PINCHED FLANGES

BACKGROUND OF THE INVENTION

1. Field of the Invention

The present invention relates to the structural reinforcements for a vehicle roof and windshield.

2. Background Art

Vehicles are assembled with structural members inside of outer body panels that are used to support the roof and windshield of the vehicle. Generally a roof rail is provided to support the vehicle roof that must meet roof crush resistance standards. Vehicle windshields are, in part, supported by what is commonly referred to as an A-pillar. Other pillars supporting the roof are referred to as a B-pillar, a C-pillar and in some car designs a D-pillar. Recently, heightened standards for roof crush resistance have been set that create challenges for vehicle designs and manufacturing processes.

Conventional A-pillars and roof rails are formed by the assembly of multiple stamped parts together by resistance welding, or spot welding, production processes. Some measure of increase roof strength may be obtained with conventional manufacturing techniques by substituting high strength steels but this approach increases the cost of the vehicle.

Hydroformed roof rails and hydroformed A-pillars have been proposed that feature tubular members that provide manufacturing challenges due to the closed cross section of the tubular member. Hydroformed structural members offer advantages relating to the inherent load carrying capacity of tubular structural members. Load carrying capacity of structural members is critical for optimizing roof strength performance.

Sizeable access holes may be required to be provided in the wall of the tubular supports through which a resistence welding gun may be used to weld the tube to other parts. However, forming access holes in the wall of the tubular member defeats the purpose of using a hydroformed tubular member since it weakens the tubular member.

As an alternative, single siding welding techniques such as MIG welding or TIG welding may be used to weld brackets and other parts to a tubular frame member. The use of single siding welding techniques requires additional capital investment and expense relating to making the single sided weld and verifying the integrity of such welds.

Stamped brackets that are attached to a hydroformed tubular A-pillar or roof rail must be assembled to close tolerances in the area of the windshield header and windshield. Stamped brackets for securing the hydroformed tubular members to the vehicle add weight to the vehicle.

The above problems relating to conventional roof rail and A-pillar assemblies and hydroformed tubular supports are addressed by applicants' invention. These and other challenges that may be solved by applicants' invention are summarized below.

SUMMARY OF THE INVENTION

According to one aspect of the present invention a support rail for a vehicle is provided. The support rail comprises a tubular body formed by a wall and at least one flange formed from a pinched portion of the wall of the body that extends outwardly from the body along at least a portion of the length of the tubular body. The pinched portion of the wall is formed so that it has two wall thicknesses. The flange may have a localized area where at least one wall thickness is removed to facilitate welding the support rail to another portion of the vehicle.

According to other aspects of the invention, two flanges may be formed along at least a first part of the length of the tubular body. One of the two flanges formed along the length of the tubular body spans only a portion of the tubular body and terminates at an intermediate point along the length of the tubular body. The other flange continues along at least a second part of the tubular body. The tubular body has a hollow cross section. The cross section of the tubular body along a first part of the length of the tube is less than the cross section of the tubular body at a second part of the tube.

According to other aspects of the invention, an integral end connector may be provided at the end of the tubular body. The end connector may define a notch formed in the wall that provides access to a diametrically opposed portion of the end connector to facilitate welding the end of the rail to another portion of the vehicle. The support rail may comprise a combination of an A-pillar and a roof rail wherein the two flanges extend from the front of the A-pillar at a forward end of the A-pillar to a door opening. One of the two flanges may extend beyond the other flange from a point above the door opening toward the rear of the vehicle. One of the two flanges of the support rail may be a windshield support flange with the other flange being a door opening flange.

According to another aspect of the present invention a roof rail for a vehicle that has a windshield and roof with the roof rail extending from a side of the windshield and along a side of the roof. The roof rail comprises an A-pillar disposed adjacent the windshield having a front door opening flange and a windshield support flange. The front door opening flange and the windshield support flange extend outwardly from radially spaced portions of a tubular section. An intermediate portion of the roof rail may be formed as a rearward continuation of the A-pillar that is disposed adjacent a front portion of the roof. The intermediate portion continues the front door opening flange from the front portion and also has a roof support flange. The front door opening flange and the roof support flange extend outwardly from radially spaced portions of the tubular section. A back portion of the roof rail is disposed adjacent a rear portion of the roof. The back portion has a rear door opening flange that extends outwardly from the tubular section. An upper surface of the tubular section of the back section supports the roof.

According to other aspects of the invention as they relate to the roof rail, a tube connector may be integrally formed at the front end of the front portion of the roof rail. The tube connector may have a notch in the tubular section that provides access to a single wall thickness of the tube connector portion that facilitates welding to the single wall thickness of the tubular section. Similarly, a tube connector portion may be integrally formed at the back end of the back portion of the roof rail. The tube connector portion may have a notch in the tubular section that provides access to a single wall thickness of the tube connector portion to facilitate welding.

There is a need for a robust A-pillar and roof rail support that may be assembled to a vehicle using conventional resistence welding tools. In addition there is a need for a roof rail and A-pillar that corresponds to the cross section of a conventional stamp support assembly due to the need to accommodate packaging considerations without adversely impacting vehicle styling. The above problems and needs are addressed by applicants' invention as will be better understood in view of the attached drawings and the following description of the illustrated embodiments.

DETAILED DESCRIPTION OF THE PREFERRED EMBODIMENT(S)

Figure 1:
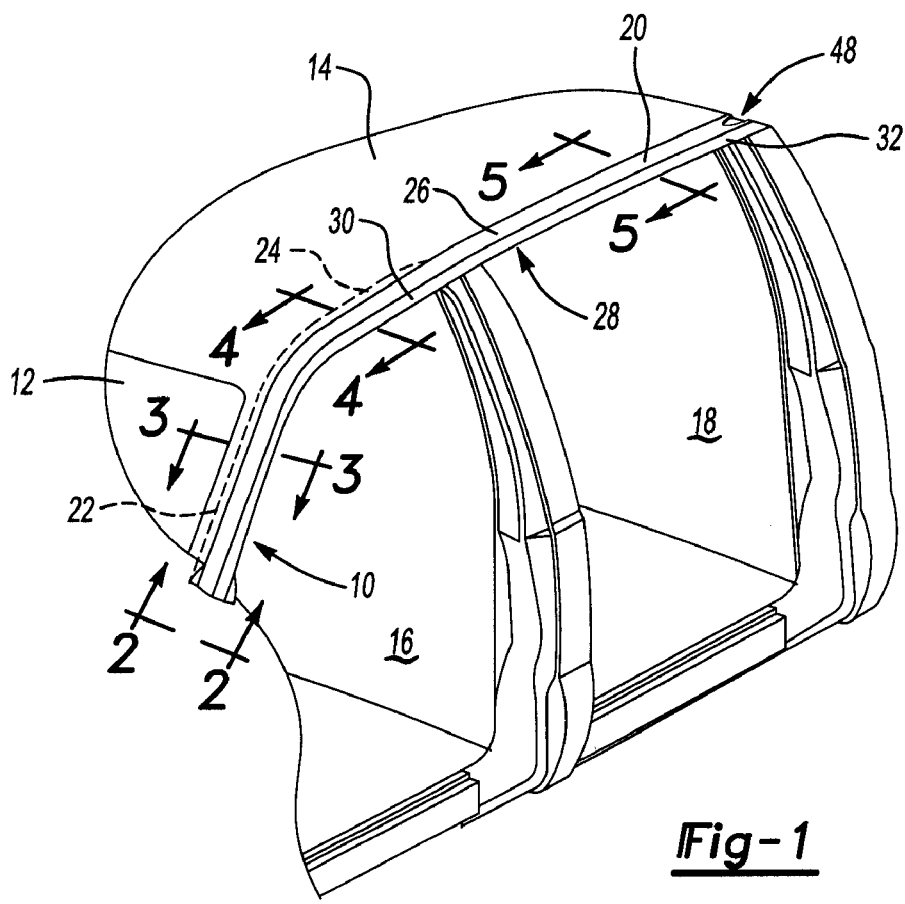
FIG. 1 is a fragmentary exploded perspective view of an A-pillar and roof rail shown in conjunction with adjacent parts of a vehicle.

Referring to FIG. 1, a combined roof rail and A-pillar 10 is shown in position relative to a windshield 12 and a roof 14. A front door opening 16 and rear door opening 18 are provided for doors (not shown) that will be installed adjacent to the roof rail and A-pillar 10.

The roof rail and A-pillar 10 includes a tubular body portion 20 that has a hollow cross section, a windshield support flange 22, a roof support flange 24, and a roof support surface 26. A door opening flange 28 including a front door portion 30 and a rear door portion 32 is also provided on the tubular body portion 20. The flanges are formed from the tubular blank that is also used to form the tubular body portion 20 in a hydroforming operation. The flanges are formed by pinching a portion of the tubular blank during the hydroforming process. A double wall metal thickness area formed by pinching the blank provides a robust and durable flange to which other body panels or brackets may be welded using a resistence welding operation.

Figure 2:
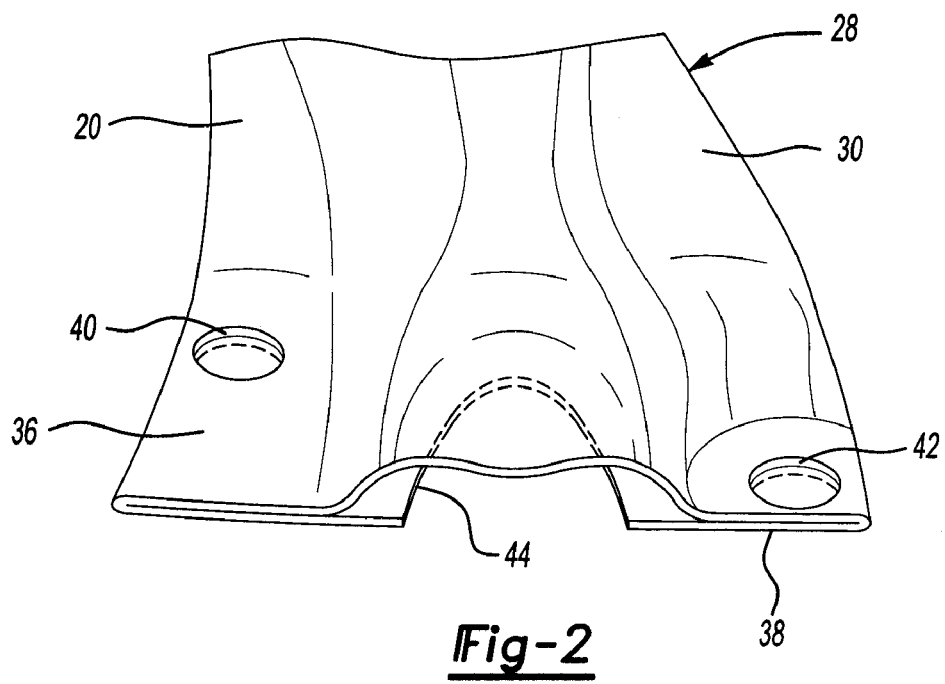
FIG. 2 is a fragmentary front elevation view of the A-pillar and roof rail of the present invention.

Referring to FIG. 2, a front tube connector 36 that is integrally formed as part of the roof rail and A-pillar 10 at the front end 38 of the roof rail and A-pillar 10. First and second blind openings 40 and 42 are shown on the windshield support flange 20 and front door portion 30 of the door opening flange 28. A notch 44 is also shown as part of the front tube connector 36. The blind openings 40, 42 are provided to facilitate welding other components to the front tube connector 36 reducing the number of metal thicknesses to a maximum of three metal thicknesses. The notch 44 is provided to allow access to other components.

A rear tube connector 48 is generally indicated on FIG. 1 that may be formed in a manner similar to the front tube connector 36 including blind openings or a notch as required to provide access for welding the roof rail and A-pillar 10 to the vehicle at the rear end of the roof rail and A-pillar 10.

Figure 3:
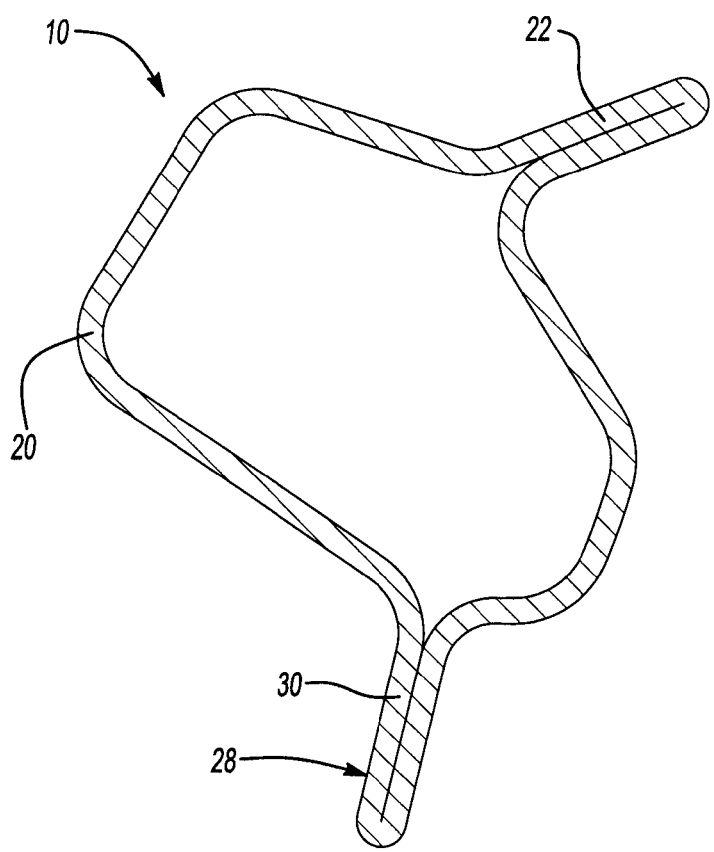
FIG. 3 is a cross sectional view taken along line 3-3 in FIG. 1.

Referring to FIG. 3, a portion of the roof rail and A-pillar 10 is shown that includes the windshield support flange 22 and the front door portion 30 of the door opening flange 28.

Figure 4:
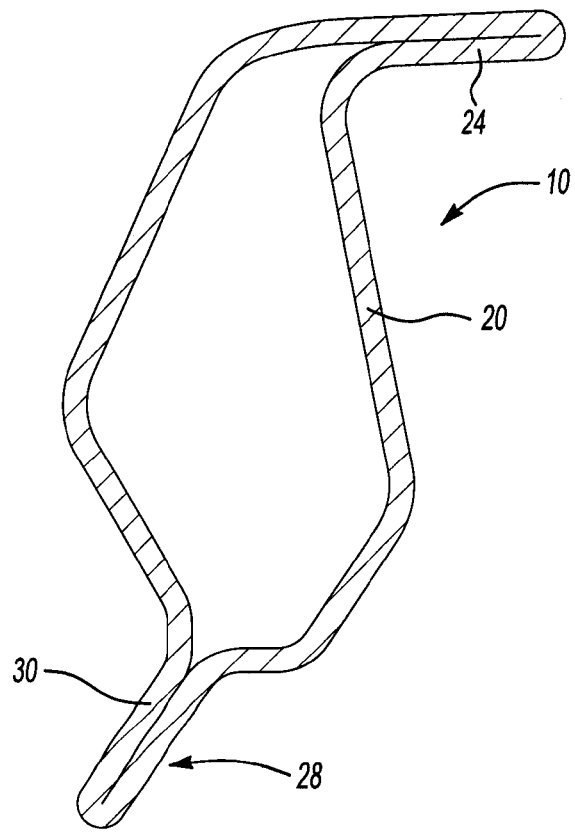
FIG. 4 is a cross sectional view taken along the line 4-4 in FIG. 1.

Referring to FIG. 4, a cross sectional view of the roof rail and A-pillar 10 is shown above the front door opening 16 that includes the tubular body portion 20, a roof support flange 24 and the front door portion 30 of the door opening flange 28.

Figure 5:
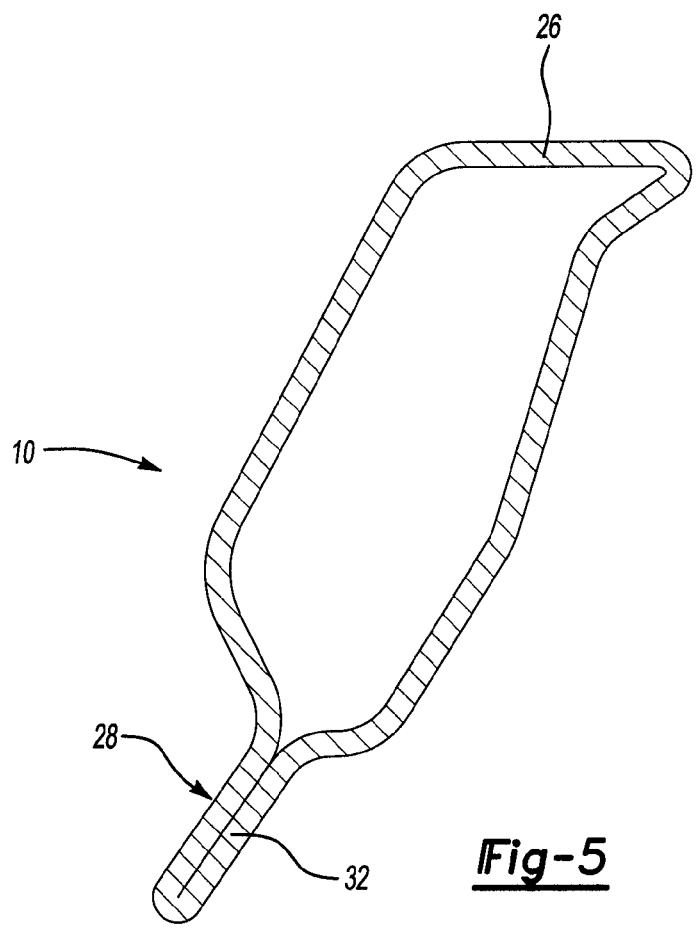
FIG. 5 is a cross-sectional view taken along the line 5-5 in FIG. 1.

Referring to FIG. 5, a cross section of the roof rail and A-pillar 10 is shown that is located above the rear door opening 18. A rear door portion 32 of door opening flange 28 is illustrated on the lower portion of the roof rail and A-pillar 10. A roof support surface 26 is provided on the top of the roof rail and A-pillar 10. It should be noted that the height of the tubular body portion 20 is increased from the portion of the roof rail and A-pillar 10 shown in FIG. 3 so that it gradually increases as shown in FIG. 4 and to the maximum height shown in FIG. 5. Increasing the height of the hollow cross section of the roof rail and A-pillar 10 increases the strength of the roof rail and A-pillar 10 and improves roof crush performance. By reducing the cross section of the tubular section adjacent the windshield, a smaller A-pillar portion may be provided that offers improved styling possibilities.

Figure 6:
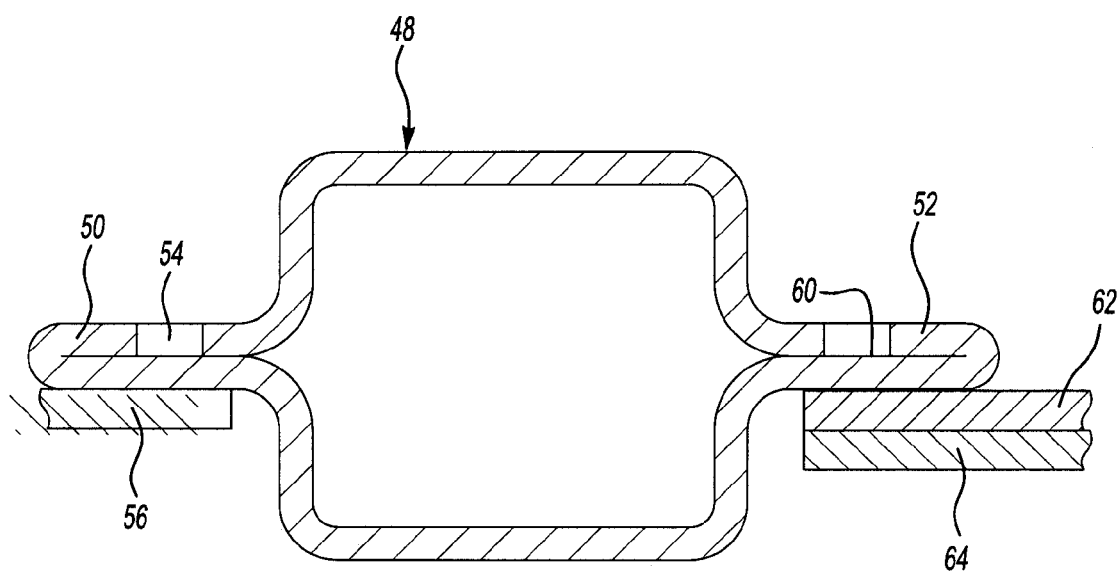
FIG. 6 is a diagrammatic cross sectional view showing a hydroformed support rail for a vehicle having a single thickness of material removed from the pinched flange portions thereof to facilitate welding.

Referring to FIG. 6, a support rail 48 is illustrated that has a generally rectangular shape and first and second oppositely oriented flanges 50, 52. The first flange 50 has a blind opening 54 through one thickness of the flange 50 to facilitate welding to a single thickness of metal 56 disposed adjacent to the flange 50. The other flange 52 has a blind opening 60 to facilitate welding the flange to two thicknesses of sheet metal 62, 64 that are disposed on opposite sides of the flange 52.

While the best mode for carrying out the invention has been described in detail, those familiar with the art to which this invention relates will recognize various alternative designs and embodiments for practicing the invention as defined by the following claims.

What is claimed:

1. A support rail for a vehicle comprising:
a tubular body formed by a wall;
first and second flanges formed from a pinched portion of the wall of the body that extend outwardly from the body along at least a first part of the length of the tubular body, the first flange spans only a portion of the tubular body and terminates at an intermediate point along the length of the tubular body, the second flange continues along at least a second part of the tubular body, wherein the pinched portion of the wall is formed to have two wall thicknesses; and
wherein one of the flange has a localized area where at least one wall thickness is removed to facilitate welding the support rail to another portion of the vehicle.

2. The support rail of claim 1 wherein the tubular body has a hollow cross-section, and wherein the hollow cross-section of the tubular body at the first part of the length of the tube is less than the hollow cross-section of the tubular body at the second part of the length of the tube.

3. The support rail of claim 1 further comprising an integral end connector provided at the end of the tubular member, wherein the end connector defines a notch formed in the wall that provides access to a diametrically opposed portion of the end connector to facilitate welding the end of the rail to another portion of the vehicle.

4. The support rail of claim 1 wherein the support rail is a combination of an A-pillar and a roof rail, and wherein the two flanges extend from the front of the A-pillar at a forward end of the A-pillar to a door opening.

5. The support rail of claim 4 one of the two flanges extends beyond the other flange from the a point above the door opening toward the rear of the vehicle.

6. The support rail of claim 5 wherein the tubular body has a hollow cross-section, and wherein the hollow cross-section of the tubular body where the two flanges are formed on the tube is less than the hollow cross-section of the tubular body where the one flange extends beyond the other flange.

7. The support rail of claim 4 one of the two flanges is a windshield support flange and the other flange is a door opening flange.

8. A roof rail for a vehicle that has a windshield and a roof, the roof rail extending from a side of the windshield and along a side of the roof, wherein the roof rail comprises:

an A-pillar disposed adjacent the windshield having a front door opening flange and a windshield support flange, wherein the front door opening flange and the windshield support flange extend outwardly from radially spaced portions of a tubular section;

an intermediate portion of the roof rail formed as a rearward continuation of the A-pillar and disposed adjacent a front portion of the roof continuing the front door opening flange from the front portion and having a roof support flange, wherein the front door opening flange and the roof support flange extend outwardly from radially spaced portions of the tubular section;

a back portion of the roof rail disposed adjacent a rear portion of the roof having a rear door opening flange and an upper surface of the tubular section for supporting the roof, wherein the rear door opening flange extends outwardly from the tubular section.

9. The roof rail of claim 8 further comprising a tube connector integrally formed at the front end of the front portion of the roof rail, the tube connector having a notch in the tubular section that provides access to a single wall thickness of the tube connector portion that facilitates welding to the single wall thickness of the tubular section.

10. The roof rail of claim 8 further comprising a tube connector portion integrally formed at the back end of the back portion of the roof rail, the tube connector portion having a notch in the tubular section that provides access to a single wall thickness of the tube connector portion that facilitates welding to the single wall thickness of the tubular section.

11. The roof rail of claim 8 further comprising a tube connector portion integrally formed at the back end of the back portion of the roof rail, the tube connector portion having an opening in the tubular section to reduce the number of metal thicknesses that are welded together.

12. The support rail of claim 8 wherein the tubular section has a hollow cross-section, and wherein the hollow cross-section of the tubular body at the first part of the length of the tube is less than the hollow cross-section of the tubular body at the second part of the length of the tube.

* * * * *